United States Patent [19]

Terry

[11] 3,829,652

[45] Aug. 13, 1974

[54] ARC WELDER AND COMBINED AUXILIARY POWER UNIT AND METHOD OF ARC WELDING

[75] Inventor: Stanley M. Terry, Dayton, Maine

[73] Assignee: Maremont Corporation, Chicago, Ill.

[22] Filed: Jan. 26, 1973

[21] Appl. No.: 327,207

[52] U.S. Cl. .................................. 219/133, 322/25
[51] Int. Cl. .......................................... H02k 17/42
[58] Field of Search ........... 219/131, 133, 134, 135, 219/25; 322/73, 80, 89, 59, 95, 96; 307/9, 10, 26, 29

[56] References Cited
UNITED STATES PATENTS

| | | | |
|---|---|---|---|
| 3,140,413 | 7/1964 | Terry et al. ............................ | 310/45 |
| 3,185,916 | 5/1965 | Brewster ............................... | 322/73 |
| 3,502,897 | 3/1970 | McCallister et al. ............. | 219/131 R |
| 3,593,121 | 7/1971 | Jones .................................. | 219/133 |
| 3,676,694 | 7/1972 | Schneider et al. .................. | 219/134 |

Primary Examiner—J. V. Truhe
Attorney, Agent, or Firm—McCormick, Paulding & Huber

[57] ABSTRACT

An arc welder is comprised of an inductor alternator, a variable voltage source for energizing the field of the alternator, a rectifier for rectifying the alterantor output, and an internal combustion engine or electric motor of suitable horsepower for driving the alternator. The welding current of the welder is controlled solely by varying the field excitation, and for various levels of field excitation the open circuit voltage remains substantially constant, the output voltage versus current characteristic is inherently such that within the range of welding voltages the current is substantially constant, and the voltage recovery time from short circuit is extremely rapid, thereby eliminating the need for auxiliary devices such as voltage and current regulators, series reactors and/or load control resistors. A switch means for selectively connecting the generating windings to the rectifier in either a delta or wye configuration and a voltage regulator may be used to adapt the alternator for use as a 110–120 volt auxiliary power unit. When used for welding, the alternator field is varied over a range of excitation values including values producing overexcitation of the field as compared to ordinary alternator usage. This produces an open circuit output voltage substantially constant and substantially equal to the maximum or peak value of open circuit voltage for which the alternator is designed at a given speed.

17 Claims, 18 Drawing Figures

ARC WELDER AND COMBINED AUXILIARY POWER UNIT AND METHOD OF ARC WELDING

BACKGROUND OF THE INVENTION

This invention relates to the art of arc welding and more particularly concerns an arc welder comprised of a unique combination of components providing high performance and efficiency together with simplified construction and control. The invention also particularly concerns a related method of arc welding and the combination with the basic arc welder of additional components to render it capable of alternate use as an auxiliary power unit.

The arc welder of this invention is a direct current welder and is particularly well adapted for manual welding operations; however, it is not necessarily limited to manual welding and it may also be used for semi-automatic or automatic operations. The welder is broadly of the type consisting of a generator for producing the welding current and a motor or engine for driving the generator, together with a rectifier for rectifying the output of the generator. In the past, welders of this general type have been subject to a number of problems, among which is the difficulty of designing and properly controlling the generator to cause it to produce output characteristics desirable for arc welding. To achieve generally desirable output characteristics and to allow for adjustment of the welding current, known arc welders of the type in question customarily employ some form of regulating circuit for regulating the voltage and/or current appearing at the output terminals, or at some other point in the welder, and often employ series reactors, load control resistors, or other devices to provide for rapid voltage recovery, to aid in striking and maintaining an arc, when going from a short circuit condition to a normal welding spacing between the electrode and workpiece. These regulators, reactors and the like all add to the complexity and cost of the welder and decrease the overall efficiency.

The welder of this invention eliminates the need for regulators, reactors and other similar devices for controlling or modifying the output of the generator, and, instead, consists solely of a generator and an associated drive means and rectifier, which is of such a design that when properly excited, an output characteristic is produced which is highly suited to arc welding and wherein by merely changing the field excitation the welding current may be varied, without substantially changing the open circuit voltage, to suit the particular welding job at hand as determined by the workpiece material and size, type of welding rod, and other factors. In particular, the generator of this invention is an inductor alternator having a stator core with generating windings mounted thereon and a field winding fixed relative to the stator core. The field winding is excited by a separate variable voltage power supply. Flux variations through the generating windings are produced by a rotor having teeth which cooperate with teeth on the stator core, but the flux passing through a given generating winding is at all times unidirectional. As the rotor is rotated, the flux passing through a given generating winding is varied between a maximum value, determined by the field excitation, and a minimum value. For low levels of field excitation, the minimum flux is quite small, but as the field excitation is increased, the minimum value of flux passing through a given generating winding increases and at higher levels of field excitation becomes substantial. This minimum value of flux which passes through a given generating winding is referred to herein as the "leakage flux." Because of the leakage flux, a characteristic of the inductor alternator used in the welder of this invention is that as the field excitation is increased the open circuit output voltage increases to a given maximum or peak value corresponding to a critical value of field excitation and then remains substantially constant or decreases slightly as the field excitation is increased beyond the critical value. In conventional use of an inductor alternator, the field winding is customarily excited at a level well below the maximum employed herein for welding applications.

In a welding operation according to this invention, the field winding of the inductor alternator is excited within a range of values including the aforesaid critical value and a large part of which range is made up of excitation values which cause the alternator to be overexcited as compared to conventional use. It has been discovered that by doing this, the inductor alternator has a performance very desirable for arc welding. Within the given range of field excitation values, the field excitation may be varied without substantially changing the open circuit output voltage. This is quite desirable. For safety reasons, the open circuit output voltage should not exceed a given value, for example, 90 volts, and for good striking of an arc should not fall below a given minimum value, for example, 65 volts. In the present case, as the excitation of the inductor alternator is varied within the aforesaid range of values, the open circuit output voltage remains substantially constant. However, as the field excitation is changed, the short circuit output current is varied over a wide range, as is desired for adjusting the welder to different welding situations, without the need for a voltage or current regulator. And, for a given value of field excitation, as the welding electrode is moved from short circuit contact with the workpiece to a normal welding spacing from the workpiece, or even to a point somewhere beyond the normal welding spacing, the welding current passing between the electrode and workpiece, through the arc established therebetween, remains substantially constant. This characteristic is important in establishing and maintaining a stable arc over a considerable range of welding arc length. Further, because the generating windings have a low self-inductance, the voltage recovery time of the alternator output is very rapid so that as the electrode is moved from direct contact with the workpiece to a normal welding position, the voltage quickly recovers from the low value present during the short circuit condition to the value normally present during the welding condition. This also aids in the striking and maintaining of the welding arc.

Among other advantages of the arc welder of this invention are that it is well adapted for construction as a relatively small and/or portable high output unit and may be made at relatively low cost. When the drive means is an internal combustion engine, the rotor may be attached to the crankshaft of the engine or other output shaft and serve as a flywheel with the stator being mounted to the stationary structure of the engine and encased in the rotor. Such mounting eliminates the need for separate bearings for the rotor and for associated supporting housings for the stator. Also, no brushed, slip rings, commutator or rotating windings are required, and all of the windings may be potted in a potting agent to render the unit impervious to moisture and dirt.

The inductor alternator used as the generator for the arc welder of this invention is a rlatively high frequency device and when its output is rectified, the result is a steady direct current voltage having a superimposed high frequency ripple component. This high frequency ripple component has a beneficial effect on the welding operation and also aids in establishing and maintaining a stable welding arc. The benefits of a superimposed high frequency component are well known, and some auxiliary devices have been proposed and used in the past for adding such component to the output of conventional direct current welders. In the present case, however, such auxiliary devices are not required.

The inductor alternator used as the welding current generator of this invention is also self-current limiting, enabling it to operate without harm while continuously short circuited. That is, the alternator has a 100 percent duty cycle regardless of its size. In other welders of this general type, a 100 percent duty cycle is usually obtainable only by making the generator undesirably large and expensive.

Preferably, the inductor alternator used in the welder of this invention is a three-phase alternator which, for welding, has its windings connected in a delta configuration. Combined with this alternator is a switch for switching the windings between the delta configuration and a wye configuration and for bringing a voltage regulator into and out of play. The alternator, when its generating windings are connected in delta fashion for welding, has an open circuit output voltage of approximately 80 to 90 volts. When the windings are changed to a wye configuration, the output voltage is increased and may be regulated by the voltage regulator to provide a regulated output voltage of 110 to 120 volts for use as a source of auxiliary power for operating power tools, lights, heaters and other devices commonly designed for use with a 110 to 120 volt alternating current or direct current power source.

Also, in the inductor alternator used in the welder of this invention, no flux reversal takes place in any part of the magnetic circuit, and flux changes occur only in the rotor and stator teeth, and, therefore, hysteresis and core losses are a fraction of those encountered in conventional A.C. or D.C. generators.

The inductor alternator used in the welder of this invention also is of such a design that the mean length per turn of the generator windings is relatively small and the space available for the windings is relatively large. Accordingly, relatively large diameter wire may be used, without undue expense, for the generating windings to reduce the resistive power loss to a minumum.

For some of the reasons mentioned above as well as because the inductor alternator used in the welder of this invention has small windage and no friction losses, the energy conversion efficiency is unusually high, therefore, a drive means of lower horsepower than required for present welders of the same output may be used to drive the alternator.

Other objects and advantages of the invention will be apparent from the detailed description of a preferred embodiment thereof which appears hereinafter.

SUMMARY OF THE INVENTION

The present invention resides in an arc welder comprised of an inductor alternator, an engine or motor for driving the alternator, a rectifier for rectifying the output of the alternator, and a variable voltage direct current power supply for selectively varying the excitation of the alternator field. The inductor alternator has an open circuit output voltage versus field excitation characteristic such that as the field excitation is increased from zero the open circuit output voltage increases until a peak value of open circuit voltage is reached at a corresponding critical value of field excitation and that as the field excitation is increased beyond such critical value the open circuit output voltage remains substantially constant and decreases only slightly. The variable voltage direct current power supply is designed and adjusted to excite the alternator field within a range of values producing corresponding open circuit output voltages approximately equal to the peak value of open circuit output voltage or at least within 10 percent of such peak value. The rectified output of the alternator is applied between a welding electrode and a workpiece and the output characteristics are such that the welding current may be precisely controlled by varying only the field excitation, and for a given setting of the field excitation the welding current remains substantially constant over a wide range of arc lengths.

The invention also resides in the inductor alternator of the aforesaid arc welder being a three-phase alternator and in the combination with such alternator of a switch means for switching the generating windings thereof between a delta configuration and a wye configuration and for bringing into and out of play a voltage regulator for regulating the output voltage when the windings are connected in a wye configuration, thereby adapting the alternator for use as a 110–120 volt auxiliary power supply.

Still further, the invention resides in a method of arc welding using an inductor alternator as the source of welding current and in overexciting the field of such alternator, as compared to conventional levels of field excitation, during a welding operation.

DETAILED DESCRIPTION OF THE PREFERRED EMBODIMENTS

Figure 1:
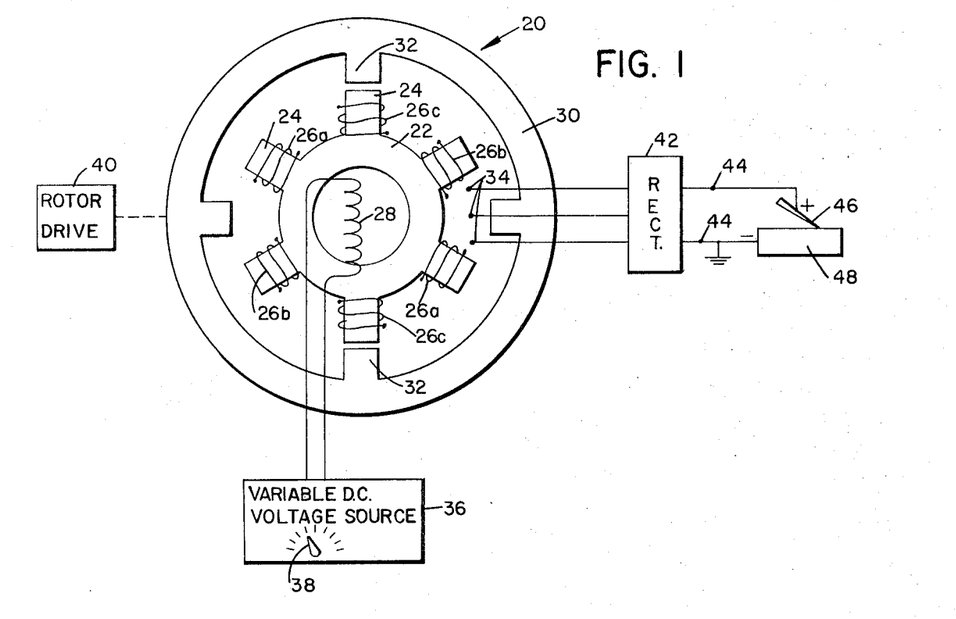
FIG. 1 is a schematic illustration of an arc welder embodying this invention.

Turning now to the drawings and first considering FIG. 1, this figure shows in schematic form an arc welder embodying this invention. This welder comprises an inductor alternator 20 which serves to generate the welding current. As used herein, and in the claims forming a part hereof, the term "inductor alternator" is used, as in its commonly accepted sense, to refer to an alternator of the type wherein the field and generating windings are fixed relative to one another and changes in flux necessary to provide output current and voltage from the generating windings ar produced by a rotating mass of magnetic material which cyclically varies the reluctance of flux paths passing through stator poles carrying the generating windings.

Within the broader aspects of the invention, the inductor alternator of the arc welder may be of various different designs and may be either a single or a multiphase device. A presently preferred form of inductor alternator for use in the welder of this invention is illustrated and described in some detail hereinafter in connection with FIGS. 11 to 15. In general, however, the alternator, as exemplified by the alternator 20 of FIG. 1, is comprised of, as shown in FIG. 1, a stationary stator core 22 of magnetic material having a plurality of stator poles 24, 24, on each of which is received a respective one of a plurality of generating windings 26, 26. Fixed relative to the stator core 22 is a field winding means 28. Depending on the particular design of the inductor alternator, this field winding means may consist either of a single winding or a number of separate windings connected in series or parallel with one another. Cooperating with the stator core is a rotor 30 having a plurality of rotor teeth 32, 32.

When the field winding means 28 is excited by a direct current voltage, a flux field is established which extends partly through the stator core and partly through the rotor. When the rotor is then rotated, the rotor teeth 32, 32, in combination with the stator poles 24, 24, establish a number of low-reluctance flux paths passing through the stator poles 24, 24 the reluctances of which paths are varied cyclically by the rotation of the rotor which brings the rotor teeth sequentially into and out of close proximity to the stator poles.

For purposes of clarity, in the inductor alternator 20 of FIG. 1, only a relatively small number of stator poles and rotor teeth have been shown, and it will be understood that in an actual inductor alternator a larger number of stator poles and rotor teeth will usually be employed. However, in FIG. 1 the stator poles and rotor teeth have been shown to be arranged in such a manner and to be so related in number as to produce a three-phase output. That is, the alternator 20 is shown to have six generating windings 26, 26 which are divided into three phase groups of two windings per group. To identify the windings of each phase group, the letters $a$, $b$ and $c$ have been added to the reference numerals 26, 26 in FIG. 1. The two windings 26a and 26a are the two windings of one phase group, the two windings 26b and 26b are the two windings of the second phase group, and the two windings 26c and 26c are the two windings of the third phase group. The windings of each phase group are electrically connected to one another and the three phase groups are in turn electrically connected to three output terminals 34, 34. In FIG. 1 the connections between the windings 26, 26 and the terminals 34, 34 have been omitted for clarity, but it will be understood that within each phase group the individual windings of the group are connected to one another in either series or parallel relationship, and the three phase groups are connected to one another and to the output terminals 34, 34 in either a delta or wye configuration.

Also included in the welder of FIG. 1 is a variable direct current voltage source 36 for energizing the field winding means 28. The source 36 may take various different forms without departing from the invention and includes a movable member 38 by which the voltage supplied to the field winding means 28 may be selectively varied. A rotor drive means 40 is drivingly connected with the rotor 30 of the alternator and may, for example, comprise an internal combustion engine or electric motor. A rectifier 42 is connected to the output terminals 34, 34 and supplies a rectified output voltage and current to its own output terminals 44, 44 which, in a welding operation, are connected respectively to a welding electrode 46 and a workpiece 48.

Figure 2:
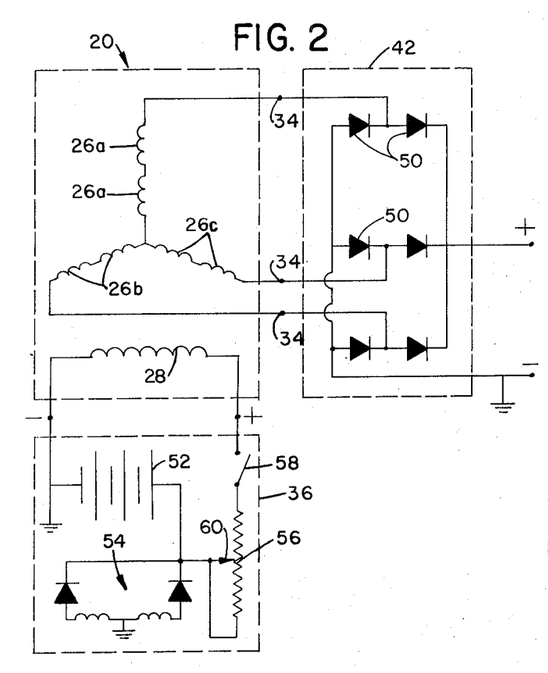
FIG. 2 is a schematic wiring diagram of the welder of FIG. 1.

FIG. 2 is a schematic wiring diagram of the arc welder of FIG. 1. In this figure it is assumed that the two generating windings of each phase group are connected in series with one another and that the phase groups are connected in a wye configuration. Also, it is assumed that the variable voltage source for energizing the field winding means comprises in part part of the battery charging system of an internal combustion engine used as the rotor drive means. Referring to FIG. 2, the same reference numerals as used in FIG. 1 have been used to identify corresponding parts in FIG. 2, and in general, such parts need not be redescribed. It will be noted, however, that the rectifier 42 is of conventional construction and consists of a series of diodes 50, 50 arranged to form a three-phase bridge rectifier. The variable voltage source 36 includes a battery 52 and a battery charging generator 54, the generator 54 being represented by only the generating windings and rectifying diodes thereof. The battery 52 and battery charging generator 54 are or may be part of the electrical system of an internal combustion engine used as the rotor drive means for the alternator 20. Included in the variable voltage source 36 and forming a part thereof is a rheostat 56 connected to the battery 52 as shown and connected to the field winding 28 of the alternator through an on/off switch 58. The wiper 60 of the rheostat corresponds to the movable member 38 of FIG. 1 and, when the switch 58 is closed, movement of the wiper 60 to different positions along the rheostat resistor causes different values of DC voltage to be applied to the field winding 28.

Figure 3:
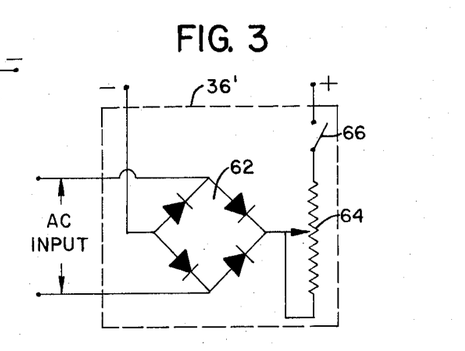
FIG. 3 is a schematic wiring diagram of a variable voltage power supply which may be used in substitution for the one shown in FIG. 2.

In cases where the rotor drive means 40 of FIG. 1 is comprised of an alternating current electric motor, the variable voltage source 36 of FIG. 1 may be provided by a rectifier and rheostat powered by the same source of alternating current power as used for the drive motor. FIG. 3 shows, for example, such a variable voltage source which is indicated by the reference numeral 36' and which may be substituted for the variable voltage source 36 of FIG. 2. The source 36' of FIG. 3 consists merely of a bridge rectifier 62 connected to the alternating current source and a rheostat 64 connected as shown to the output of the rectifier 62 and, through an on/off switch 66, to the field winding 28 of the alternator.

Figure 4:
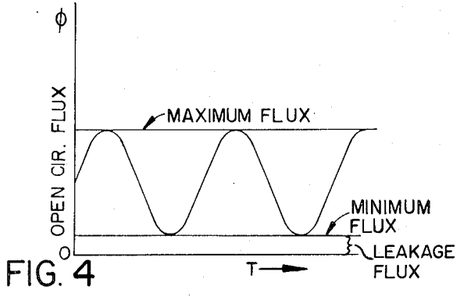
FIG. 4 is a diagram illustrating the variation of flux through one stator pole of an inductor alternator used in the welder of this invention for a low level of the field excitation.
Figure 5:
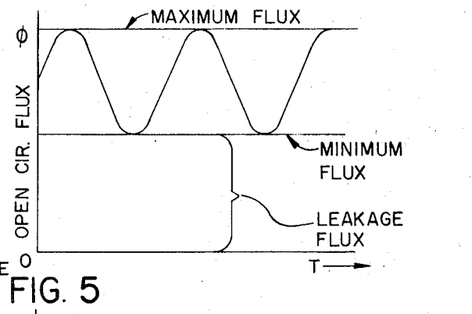
FIG. 5 is a view similar to FIG. 4 but shows the variation of flux through the stator pole for a higher level of field excitation.

In the usage of the arc welder of FIG. 1, the inductor alternator 20 has its field winding means 28 excited at an unconventionally high level of excitation, as explained in more detail hereinafter. By doing this, it has been discovered that the alternator produces output characteristics very well suited to arc welding operations. These characteristics are partly dependent on the fact that the magnetic flux passing through the generating windings is unidirectional and not reversing as is the case with most other types of generators. Referring to FIG. 1, for example, when the field is excited and the rotor rotated, the flux passing through any one stator pole 24 always flows in the same direction (radially outwardly or radially inwardly) and is varied generally sinusoidally between a maximum value and a minimum value. FIG. 4 illustrates the variation of the flux passing through one stator pole when the field winding is excited by an excitation value near the low end of the welding range of excitations. FIG. 5 shows the flux passing through the same stator pole when the field winding means is excited at a much higher level. Referring to both FIGS. 4 and 5, the flux through a stator pole varies between the illustrated maximum value of flux and the illustrated minimum value of flux. The maximum value of flux is achieved when the stator pole in question has a rotor tooth angularly aligned therewith, and the minimum value of flux is achieved when the stator pole is located midway between two rotor teeth. That is, some minimum amount of flux, due to leakage, will flow through a stator pole even when no rotor tooth is aligned therewith. This flux is referred to as the leakage flux as indicated in FIG. 4 and FIG. 5. As the field strength is increased from the value represented by FIG. 4, both the leakage flux and the maximum flux increase. Initially, in a low range of field excitation below the welding range, the maximum flux increases more rapidly than the minimum or leakage flux. However, in the higher welding range of field excitation, as the field excitation is varied, the maximum flux and leakage flux change by approximately equal amounts, as is evident from FIGS. 4 and 5. This means that the amount by which the flux is varied, between its maximum and minimum values, as the rotor is rotated remains substantially constant, and, therefore, the open circuit voltage also remains substantially constant.

Figure 6:
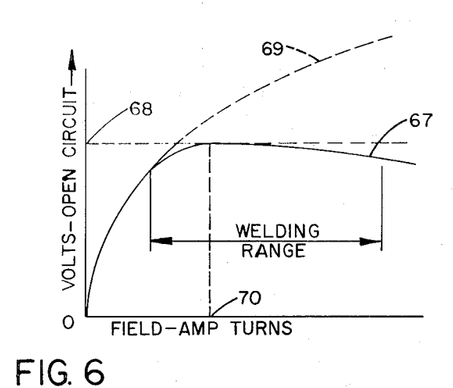
FIGS. 6, 7, 8 and 9 are diagrams showing the electrical output characteristics of a welder of this invention.

FIG. 6, by the solid line 67 thereof, shows the general nature of the open circuit output voltage versus field strength characteristic of an inductor alternator of the type employed in an arc welder of this invention. By way of contrast, the broken line 69 represents the general characteristic curve for a flux-reversing device. From the curve 67 for the inductor alternator it will be seen that as the field strength is increased from zero the open circuit output voltage increases to a maximum or peak value, indicated at 68, occurring at a corresponding critical value 70 of field excitation, and that as the field excitation is thereafter increased beyond the critical value 70 the open circuit output voltage tends to decrease slightly. Furthermore, the top of the characteristic curve 67 is relatively flat so that over a relatively wide range of field excitation values the open circuit output voltage remains substantially constant and close to the peak value 68. In the use of the alternator as a current generator for an arc welder in accordance with this invention, the field excitation is varied within a range, such as indicated in FIG. 6, whereby the open circuit output voltage remains approximately equal to the maximum or peak value of open circuit output voltage obtainable. In any event, designed output of the alternator and the welding range of field excitation values is such that the corresponding open circuit output voltage is within an ideal welding range of open circuit voltages and close to the peak value of open circuit output voltage 68. Generally, it has been found that for most welding operations the ideal welding range of field excitation values is such that the corresponding open circuit voltages are within 15 percent of the peak value of open circuit voltage 68. However, there are some special situations, as, for example, when welding very thin stock, when the field may be excited by an excitation value below such ideal range. This reduces the open circuit voltage and the welding output current, as pointed out hereinafter in connection with FIG 7, as may be desired for the special situation, and the desirable characteristic of relatively steady welding current despite changes in arc length remains.

Figure 7:
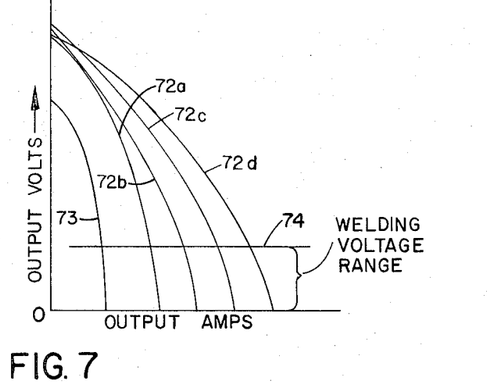

FIG. 7 is a family of curves showing the output current versus output voltage characteristic of the welder of this invention for various values of field excitations. The characteristic curves of FIG. 7 are indicated at 72a, 72b, 72c, 72d and 73. The curves 72a, 72b, 72c and 72d are curves for values of field excitation within the ideal welding range of field excitation indicated in FIG. 6, and the curve 73 is a curve for a value of field excitation below the ideal welding range. The curve 72a is that obtained at a low level of field excitation within the welding range, and the curves 72b, 72c and 72d are those produced by successively greater values of field excitation. In arc welding, the arc is struck by moving the electrode into short circuit direct contact with the workpiece and by then moving it away from the workpiece to a normal welding position. During the short circuit direct contact of the electrode with the workpiece, the voltage appearing between the electrode and the workpiece is substantially zero, and as the electrode is moved away from the workpiece, the voltage varies with the arc length or spacing between the electrode and workpiece. In FIG. 7 the line 74 represents the output voltage achieved when the electrode is moved to a position corresponding to the maximum spacing customarily encountered between the workpiece and the electrode during a welding operation. Therefore, the space betwen the zero voltage axis and the line 74 represents the normal range of voltages encountered during a welding operation, that is, during the striking and maintenance of an arc.

From FIG. 7 it will be noted that for each value of field excitation represented by the various curves 72a, 72b, 72c, 72d and 73, the output current within the welding voltage range is substantially constant. That is, the characteristic curve is substantially vertical in the welding voltage range so that the welding or arc current remains relatively constant despite changes in the output voltage caused by changes in the spacing of the electrode from the workpiece. Accordingly, as the electrode is moved toward or away from the workpiece to change the arc length, the arc current remains constant as is desirable for establishing and maintaining the arc. Furthermore, it will be noted from FIG. 7 that the output current is dependent on the field excitation. Therefore, the output current may be varied as desired to suit the particular welding job at hand by merely varying the field excitation within the welding range of excitations.

Still referring to FIG. 7, it will be further noted, as also evident from FIG. 6, that when the output current is zero, indicating an open circuit or no-load condition, the output voltage remains substantially constant despite changes in the field excitation when the field excitation is within the ideal welding range of field excitation as it is for the illustrated curves 72a, 72b, 72c and 72d. The alternator may be so designed, for example, that this substantially fixed value of open circuit voltage is approximately 90 volts. The fact that the open circuit voltage does not increase beyond this value as the field excitation is increased is desirable for safety reasons, and the fact that it does not decrease substantially below this value as the field excitation is decreased is desirable, as an open circuit output voltage in the 80 to 90 volt range is considered ideal for establishing an arc. However, if the field excitation is set to a value substantially below the ideal range of excitation, the open circuit output voltage will be substantially less than the substantially constant value achieved by excitation within the ideal welding range, as evident from curve 73.

Figure 8:
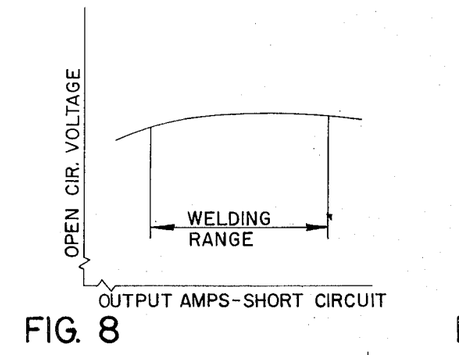
Figure 9:
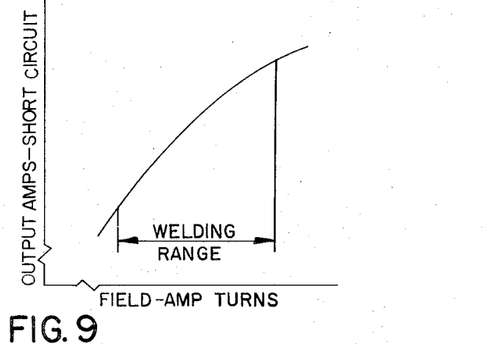

FIGS. 8 and 9 show further characteristics of the inductor alternator used in the arc welder of this invention. FIG. 8 shows the manner in which the open circuit voltage varies with the short circuit current over the welding range of field excitations. As also evident from FIG. 7, FIG. 8 illustrates that although the short circuit output current may be varied widely, the open circuit voltage remains substantially constant within the ideal range of field excitations. FIG. 9 shows the characteristic of short circuit output current versus field excitation over the ideal welding range of field excitations. This figure illustrates, perhaps more clearly than FIG. 7, that as the field excitation is increased over the ideal welding range of excitations, the short circuit output current varies substantially linearly with the changes in the field excitation.

Figure 10:
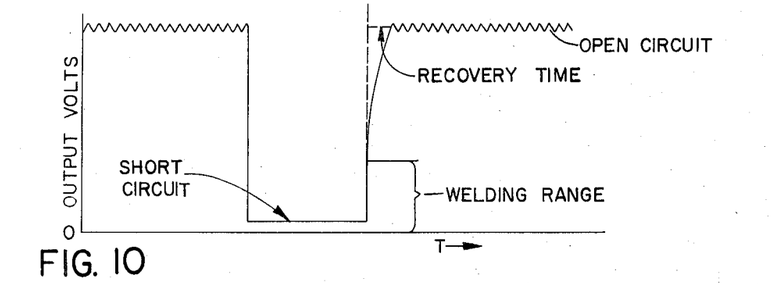
FIG. 10 is a diagram illustrating the voltage recovery of the output of a welder of this invention in going from a short circuit condition to an open circuit or no-load condition.
Figure 11:
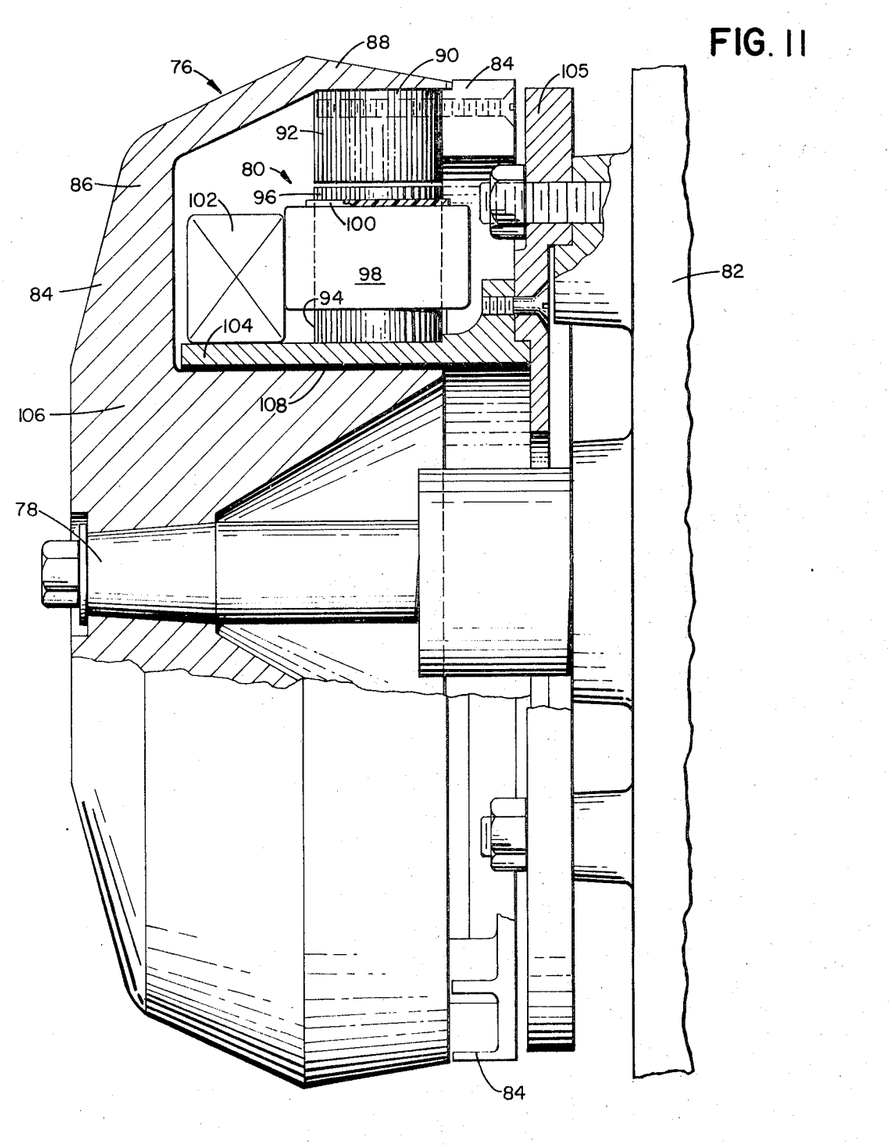
FIG. 11 is a side view partly in elevation and partly in vertical section of an inductor alternator used as the welding current generator in an arc welder of this invention.

Another important characteristic of the inductor alternator used as the welding current generator of the arc welder of this invention is that it provides a very rapid recovery time for the output voltage as the electrode is moved from a short circuit to an open circuit condition relative to the workpiece. FIG. 10 illustrates the output voltage appearing between a workpiece and an electrode as the electrode is moved from an open circuit condition to a short circuit condition and suddenly back to an open circuit condition. The illustrated recovery time is the time required for the output voltage to recover to its normal open circuit or no-load value as the electrode is moved from the short circuit contact with the workpiece to the open circuit condition. In actual tests, this recovery time has been found to be on the order of 6 milliseconds. Of course, in striking an arc in an arc welding process, the electrode is moved from short circuit contact to a close spacing with the workpiece rather than to a full open circuit position. Therefore, the time required for the voltage to recover from the short circuit voltage to the normal welding voltage is even less than the total recovery time shown in FIG. 10. This rapid recovery time, it will be understood, is, of course, quite desirable in the successful establishment and maintenance of a welding arc. As may be evident from the detailed description of an inductor alternator immediately following, the reason for this rapid voltage recovery time is largely due to the fact that the generating windings of the inductor alternator have very low self-inductances as compared to other types of electrical generators.

Reference is now made to FIGS. 11 to 15 for a detailed description of an inductor alternator which may be used as the alternator 20 of the welder shown in FIG. 1. Referring to FIGS. 11 to 15, the alternator there shown is generally of the type disclosed in prior U.S. Pat. No. 3,140,413. It comprises a rotor 76, adapted for attachment to an engine shaft 78 or the like, and a stator 80 adapted for attachment to the stationary structure of an associated engine or other drive means 82 for the rotor. When the drive means 82 is an internal combustion engine, the stationary structure may, for example, be a part of the engine block and the shaft 78 may be the engine crankshaft. Rotation of the shaft 78 causes rotation of the rotor relative to the stator, and the rotor has a flywheel effect on the shaft 78 and may serve as the flywheel for the engine. A fan 84 is attached to the rotor 76 for rotation therewith and provides cooling air to the alternator. The rotor 76, in more detail, is comprised of a generally cup-shaped member 84 of magnetic material having a radially extending web portion 86 and a generally axially extending rim portion 88. Carried internally of the rim portion 88 is a laminated annulus 90 providing a circumferentially spaced series of radially inwardly extending rotor teeth 92, 92.

The stator 80 includes a generally annular stator core 94 of laminated magnetic material providing a circumferentially spaced series of radially outwardly extending stator poles 96, 96 which cooperate with the rotor teeth 92, 92. Each stator pole 96 receives one generating winding 98 and the generating windings 98, 98 are held in place on their poles 96, 96 by retaining clips 100, 100, of plastic or other nonmagnetic material, extending between the outer end of the stator poles. Associated with the stator core is an annular field winding 102. The stator core 94 and the field winding 102 are mounted on an axially extending cylindrical member 104 of magnetic material. The cylindrical member 104 is in turn attached to an adapter plate 105 adapted for connection to the engine 82, the adapter plate 105 preferably being made of a non-magnetic material to magnetically insulate the alternator from the structure of the engine or other drive means 82. Although not shown in the present drawings, the field winding 102, the stator core 94 and the generating windings 98 may be potted in a suitable potting agent, as disclosed in the aforementioned U.S. Pat. No. 3,140,413, to combine such parts into a single water and dirt impervious unit.

The cup-shaped rotor member 48 includes a hub portion 106 which extends axially into the interior of the cylindrical member 104. This hub portion has an outside surface closely spaced from the inside surface of the cylindrical member to form a relatively thin air gap 108 of large area between the hub and the cylindrical member.

Figures 12, 15:
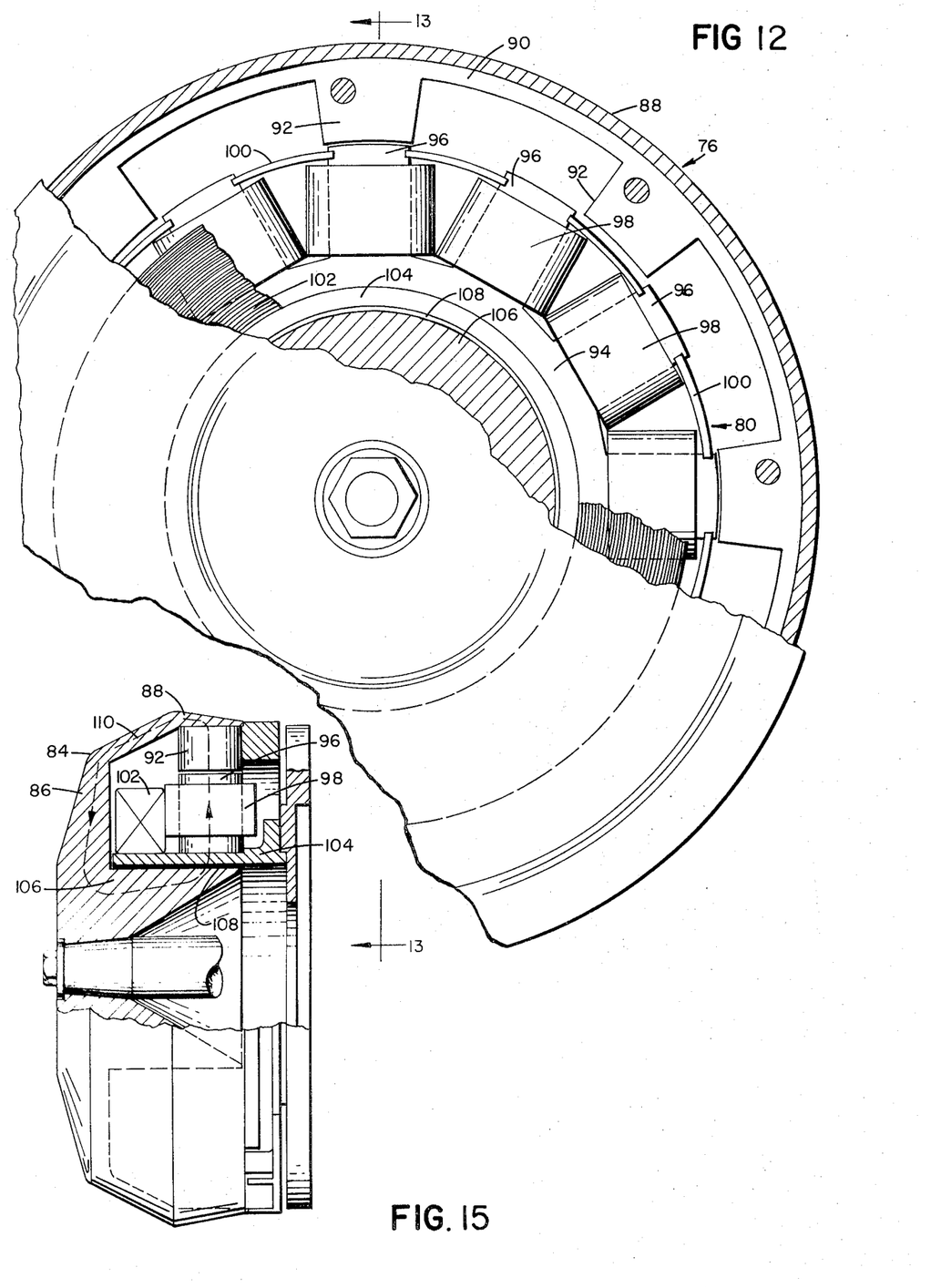
FIG. 12 is an end view partly in elevation and partly in section of the alternator of FIG. 11.
FIG. 15 is a view generally similar to FIG. 11, but in reduced scale, showing the flux path through one stator pole and rotor tooth.
Figure 13:
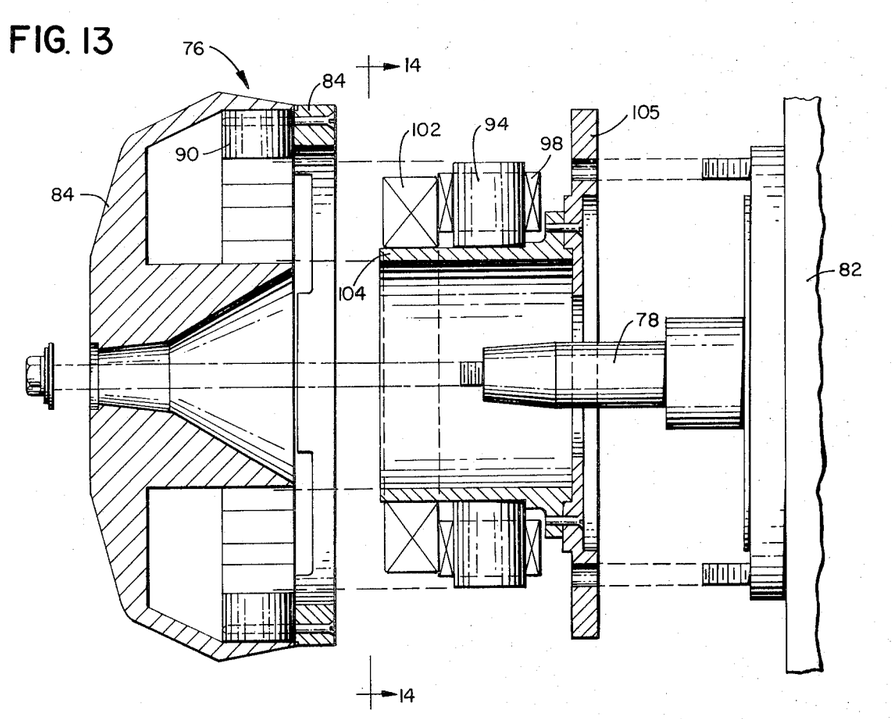
FIG. 13 is an exploded vertical sectional view of the alternator of FIG. 11 taken generally on the line 13—13 of FIG. 12.
Figure 14:
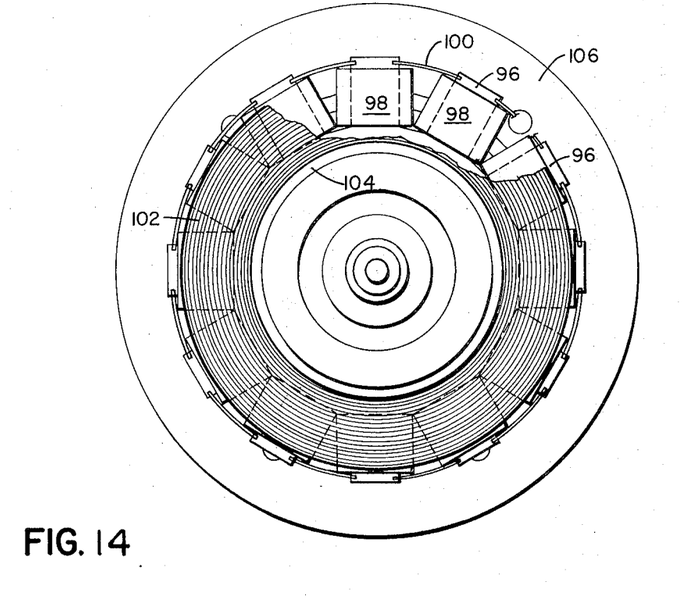
FIG. 14 is an end elevational view of the stator of the alternator of FIG. 11 taken generally on the line 14—14 of FIG. 13.

As shown best in FIG. 15, when the field winding 102 is excited by direct current, a generally toroidally-shaped flux field is produced through the winding which flows through the rotor and stator along a number of low-reluctance flux paths formed by the stator poles 96, 96 and the rotor teeth 92, 92, one such path being shown by the broken line 110 in FIG. 15. Starting from the stator pole 96 the flux passes, through the air gap between the stator pole and the rotor tooth 92, to the tooth 92 and from the tooth 92 passes through the rim 88 and web 86 of the rotor member 84 to the hub 106, and from the hub through the air gap 108 to the cylindrical member 104 and back to the stator pole 96. Of course, as the rotor is rotated the reluctance of this flux path is varied by different rotor teeth being successively brought into and out of alignment with the illustrated stator pole with the result that the flux passing through the stator pole and the associated generating winding 98 is varied cyclically to induce a corresponding alternating voltage in the generating winding.

The stator pole end faces can be of the same circumferential length as the end faces of the rotor teeth; however, the performance of the illustrated alternator is enhanced in several respects by making the rotor tooth end faces slightly longer circumferentially than the stator pole end faces as shown in FIG. 12. The illustrated alternator has, as will be evident from FIGS. 12 and 14, a total of 12 stator poles and eight rotor teeth, thereby giving the alternator a three-phase output. That is, the 12 generating windings are divided into three different phase groups of four windings per group. The alternator can, however, have more or fewer teeth or poles in the stator and rotor without deviating from the desired three-phase output and other favorable design characteristics as long as a ratio of three stator poles to two rotor teeth is maintained.

In connection with the above description of the alternator of FIGS. 11 to 15, it should be noted that due to the rotor tooth and stator pole relationships, the flux variations in the stator and rotor are confined generally to the stator poles and to the rotor teeth and that in the remainder of the magnetic flux circuit the flux is not only unidirectional but of a substantially constant value. That is, no flux reversals occur in any part of the magnetic circuit and substantially no flux variations occur in the rim, web or hub portions 88, 86 and 106 of the rotor, in the cylindrical member 104, or in the annular part of the stator core 94. Hysteresis and eddy current losses in these parts are, therefore, substantially eliminated and they may, if desired, be made of a solid or non-laminated construction as are, for example, the illustrated rim, web and hub portions of the rotor and the cylindrical member 104. Furthermore, the flux variations which do occur in the rotor teeth and stator poles do not have any substantial affect on the total flux linking the field winding 102, and, therefore, do not induce voltages in the field winding which would adversely affect the externally applied field voltage.

The generating windings of the alternator of FIGS. 11 to 15 within each of the three phase groups may be connected to one another in either series or parallel relationship and the three phase groups may be connected to one another in either a delta or wye configuration. Preferably, however, the windings are connected to one another, in each phase group, in a series relationship.

Figure 16:
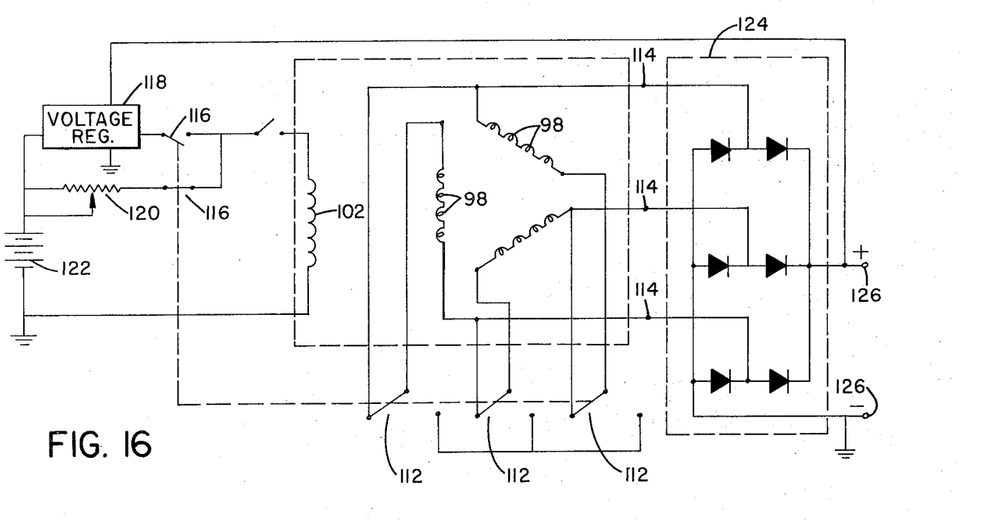
FIG. 16 is a schematic wiring diagram of a combined arc welder and auxiliary power unit embodying this invention.

Also, when a three-phase inductor alternator, such as the alternator of FIGS. 11 to 15, is used as the welding current generator for the welder of this invention, a switch means and voltage regulator may be combined with the alternator to adapt it for alternate use as an auxiliary power source for powering portable tools, lights, heaters and other devices so designed that they can be powered by a D.C. power source of common 110 volt to 120 volt voltage level. FIG. 16 is a schematic wiring diagram showing the alternator of FIGS. 11 to 15 combined with such a switch means and voltage regulator. In essence, the switch means operates to switch the phase groups of the alternator windings between a delta and a wye configuration and to alternately bring into and out of play the voltage regulator and the rheostat for selectively varying the field excitation. During a welding operation, the generating windings are connected in a delta configuration and the rheostat for selectively adjusting the field excitation is brought into play. Further, the alternator is of such a design as to produce approximately a 90 volt open circuit output voltage for the field excitation within the welding range of excitation values as previously discussed. For auxiliary power, the switch means connects the alternator windings in a wye configuration and brings into play the voltage regulator. As a result of the change from the delta configuration to the wye configuration, the output voltage of the alternator is increased and the voltage regulator senses the output voltage and adjusts the field excitation to maintain the output voltage at a desired level.

Referring to FIG. 16, the generating windings are indicated at 98, 98 and the three phase groups formed thereby are connected to three sets 112, 112 of contacts which are operable in unison to connect the phase groups to the output terminals 114, 114 in either a delta or wye configuration. Also forming part of the switch means are two other sets 116, 116 of contacts which are operated in unison with the contact sets 112, 112 to alternately connect either a voltage regulator 118 or a rheostat 120 to the field winding 102. The power source for the field excitation circuit is a battery 122 which may be part of the electrical system for an engine used to drive the alternator. The output of the alternator is rectified by a rectifier 124 having two output terminals 126, 126 which may be connected either to a welding electrode and workpiece or to another different load.

Figure 17:
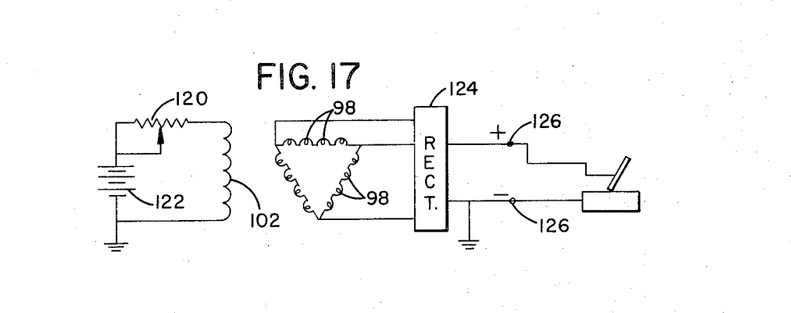
FIG. 17 is a schematic wiring diagram showing the effective circuit for the device of FIG. 16 when the switch means tehreof is set to connect the generating windings in a delta configuration.
Figure 18:
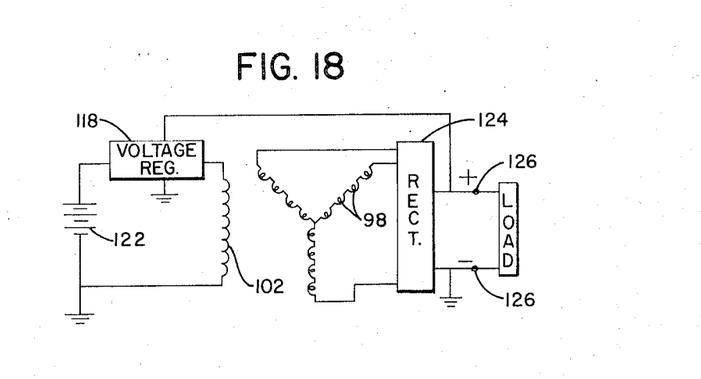
FIG. 18 is a schematic diagram illustrating the effective circuit for the device of FIG. 16 when the switch means thereof is set to connect the generating windings in a wye configuration.

FIGS. 17 and 18 show the circuits formed when the switch means of FIG. 16 is set in one and the other of its positions. FIG. 17 corresponds to the switch setting illustrated in FIG. 16 wherein the rheostat 120 is brought into play for adjusting the excitation of the field winding 102 and the generating windings 98, 98 are connected in a delta configuration, thereby adapting the system to use as a welder. FIG. 18 illustrates the circuit formed by the alternate setting of the switch whereby the voltage regulator 118 is brought into play to vary the excitation of the field winding 102 so as to maintain the output voltage from the rectifier 124 substantially constant and whereby the generating windings 98, 98 are connected in a wye configuration to the rectifier 124.

I claim:

1. An arc welder comprising an inductor alternator having a field winding and a plurality of generating windings, means for driving said alternator, a variable voltage source of direct current connected to excite said field winding, two output terminals, means for connecting one of said output terminals to a workpiece, a welding electrode, means connecting the other of said output terminals to said welding electrode, and a rectifier connected between said generating windings and said two output terminals for supplying said two output terminals with a rectified D.C. voltage derived from the alternating voltages induced in said generating windings.

2. An arc welder as defined in claim 1 further characterized by said inductor alternator having a range of field excitation values over which the open circuit output voltage thereof remains substantially constant and also having a welding output current which is generally proportional to the field excitation for at least values of field excitation falling within said aforesaid range.

3. An arc welder as defined in claim 1 further characterized by said inductor alternator having an open circuit output voltage versus field excitation characteristic such that as said field excitation is increased from zero said open circuit output voltage increases until a peak value of open circuit output voltage is reached at a corresponding critical value of field excitation and as said field excitation is increased beyond said critical value said open circuit output voltage remains substantially constant, said variable voltage source of direct current being such as to excite said field winding at least over a range of values producing corresponding open circuit voltages within 15 percent of said peak value of open circuit output voltage.

4. An arc welder comprising an inductor alternator having a stationary stator core with a plurality of generating windings thereon, a stationary field winding and a rotor, means for driving said rotor, an adjustable voltage source connected to excite said field winding, a rectifier connected to said generating windings to rectify the alternating voltages induced in said generating windings, said rectifier having two output terminals, a welding electrode, means for connecting one of said two output terminals to a workpiece, and means connecting the other of said two output terminals to said welding electrode whereby a welding arc is produced when said electrode is brought into a welding relationship with said workpiece.

5. An arc welder comprising an inductor alternator having a stator core with a plurality of stator poles, a plurality of generating windings each received on a respectively associated one of said stator poles, at least one field winding fixed relative to said stator core, and a rotor rotatable relative to said stator core and cooperable with said stator core to cyclically vary the flux passing through said stator poles and to thereby induce alternating voltages in said generating windings, a selectively variable voltage source of direct current connected to said at least one field winding for selectively varying the excitation of said at least one field winding, two output terminals, means for connecting one of said output terminals to a workpiece, a welding electrode, means connecting the other of said output terminals to said welding electrode, a rectifier connected between said generating windings and said two output terminals for supplying said two output terminals with a rectified voltage derived from the alternating voltages induced in said generating windings, and a drive means for rotating said rotor.

6. An arc welder as defined in claim 5 further characterized by said means for rotating said rotor being an internal combustion engine having an output shaft which rotates in synchronism with the operation of said engine, said rotor being attached to said output shaft for rotation therewith and comprising an annular rim portion arranged concentrically of said shaft and extending axially thereof, and said stator core being located within said annular rim portion of said rotor.

7. An arc welder as defined in claim 5 further characterized by said inductor alternator being of such a construction that a three-phase alternating voltage is induced in said plurality of generating windings, said plurality of generating windings being divided into three groups with an associated one of the three phases of the output voltage being induced in the windings of each one of said groups, switch means for selectively switching said groups of windings between a delta configuration and a wye configuration, and a voltage regulator responsive to the rectified output voltage and operable to vary the excitation of said at least one field winding to maintain said rectified output voltage at a substantially constant value, said switch means including means for bringing said voltage regulator into play when said switch means is set to connect said groups of generating windings in a wye configuration and for taking said voltage regulator out of play when said switch means is set to connect said groups of generating windings in said delta configuration.

8. An arc welder as defined in claim 5 further characterized by said means for rotating said rotor of said inductor alternator being an internal combustion engine having an electrical ignition system including a battery and a battery charging generator, said battery charging generator being separate from said inductor alternator, said selectively variable voltage source of direct current for exciting said at least one field winding comprising a circuit connected to said battery and battery charging generator so as to be excited by the voltage appearing across said battery.

9. An arc welder as defined in claim 5 further characterized by said stator core having an annular portion with said poles extending radially outwardly from said annular portion and defining an annular series of circumferentially spaced end faces, said rotor including an annular rim surrounding said stator core, a hub portion, and a web extending radially between said hub and said rim, said at least one field winding comprising an annular field winding arranged concentrically with said stator core and located between said stator core and said rotor web.

10. An arc welder as defined in claim 9 further characterized by said rotor rim and said rotor web being made of magnetic material and cooperating with said stator core to provide a number of low-reluctance flux paths for the flux produced by said annular field coil which flux paths pass through said stator poles.

11. An arc welder as defined in claim 5 further characterized by said means for rotating said rotor of said inductor alternator being an internal combustion engine having an electrical ignition system including a battery and a battery charging generator, said battery charging generator being separate from said inductor alternator, said selectively variable voltage source of direct current for selectively varying the excitation of said at least one field winding comprising a circuit connected between said battery and said at least one field winding and having an adjustable means for selectively causing a variable proportion of the voltage across said battery to be imposed across said at least one field winding.

12. An arc welder comprising an inductor alternator having a generally annular stator core with an annular series of stator poles, a plurality of generating windings each received on a respectively associated one of said stator poles, an annular field winding fixed relative to said stator core and arranged generally concentric therewith, and a rotor rotatable relative to said stator core and having an annular series of rotor teeth, said annular field winding when excited by a direct current producing a generally toroidal flux field and said rotor teeth and stator poles forming a number of low reluctance paths for said flux with said flux passing unidirectionally through said rotor teeth and stator poles and with the reluctance of said flux paths being cyclically varied as said rotor is rotated to induce alternating voltages in said generating windings, a selectively variable voltage source of direct current connected to said at least one field winding for selectively varying the excitation thereof, two output terminals, means for connecting one of said output terminals to a workpiece, a welding electrode, means connecting the other of said output terminals to said welding electrode, a rectifier connected between said generating windings and said two output terminals for supplying said two output terminals with a rectified D.C. voltage derived from the alternating voltages induced in said generating windings, and a drive means for rotating said rotor.

13. A combined arc welder and auxiliary power unit comprising an inductor alternator having a three-phase alternating output voltage and including a plurality of generating windings divided into three groups with an associated one of the three phases of the output voltage being induced in the windings of each one of said groups, said inductor alternator also having a stator core on which said generating windings are received, a field winding fixed relative to said stator core, and a rotor rotatable relative to said stator core to cause alternating voltages to be induced in said generating windings, a three-phase rectifier connected with said generating windings to rectify the output voltage of said alternator, a switch means between said groups of generating windings and said rectifier for selectively connecting said groups of windings to said rectifier in either a delta configuration or a wye configuration, said rectifier having two output terminals, a welding electrode, a load selector circuit including an output switch connected with at least one of said output terminals of said rectifier, said output switch having two positions and being connected so that in one position of said switch said load selector circuit connects one of said output terminals to said welding electrode and the other of said output terminals to a workpiece for arc welding and in the other of said two positions of said switch said load selector circuit connects said two output terminals to another load, and a voltage regulator responsive to the rectified output voltage and operable to vary the excitation of said field winding to maintain said rectified output voltage at a substantially constant value, said switch means including means for bringing said voltage regulator into play when said switch means is set to connect said groups of generating windings in a wye configuration and for taking said voltage regulator out of play when said switch means is set to connect said groups of generating windings in said delta configuration.

14. A combined arc welder as defined in claim 13 further characterized by a selectively variable voltage source of direct current connected to excite said field winding means, said switch means further including means for bringing said selectively variable voltage source into play when said switch means is set to connect said groups of generating windings in a delta configuration and to take said selectively variable voltage source out of play when said switch means is set to connect said generating windings in a wye configuration.

15. The method of arc welding which comprises the steps of providing an inductor alternator driven at a given speed, said inductor alternator having at least one generating winding and also having a field winding the excitation of which field winding controls the output voltage produced by said at least one generating winding, rectifying the output voltage produced by said at least one generating winding, applying the rectified output voltage between an electrode and a workpiece to produce a welding arc when said electrode is brought into a welding relationship with said workpiece, and controlling the welding current passing between said electrode and said workpiece by varying the excitation of said field winding.

16. The method of arc welding which comprises the steps of providing an inductor alternator having at least one generating winding and also having a field winding the excitation of which field winding controls the output voltage produced by said at least one generating winding, driving said inductor alternator at a speed at which it has an open circuit output voltage versus field winding excitation characteristic curve such that as said field winding excitation is increased from zero said open circuit output voltage produced by said at least one generating winding first increases to a peak value and thereafter remains substantially constant, exciting said field winding of said alternator with a current which produces an open circuit output voltage from said at least one generating winding approximately equal to said peak value of open circuit voltage, rectifying the output voltage produced by said at least one generating winding, and applying the rectified output voltage between an electrode and a workpiece to produce a welding arc when said electrode is brought into a welding relationship with said workpiece whereby a welding current is produced which is substantially proportional to the current passing through said field winding and which welding current may be readily varied by varying only said current passing through said field winding.

17. The method of arc welding which comprises the steps of providing an inductor alternator having at least one generating winding and also having a field winding the excitation of which field winding controls the output voltage produced by said at least one generating winding, driving said inductor alternator at a speed at which it has an open circuit output voltage versus field winding excitation characteristic curve such that as said field winding excitation is increased from zero said open circuit output voltage produced by said at least one generating winding first increases to peak value and thereafter remains substantially constant, exciting said field winding of said alternator within a range of excitation values corresponding to a range of open circuit output voltages starting from a value of open circuit voltage approximately 15 percent less than said peak open circuit voltage on the rising portion of said characteristic curve to a value of open circuit voltage approximately 15 percent less than said peak open circuit voltage on the maximum excitation portion of said characteristic curve, rectifying the output voltage produced by said at least one generating winding, applying the rectified output voltage between an electrode and a workpiece to produce a welding arc when said electrode is brought into a welding relationship with said workpiece, and controlling the welding current by varying the excitation of said field winding within said range of excitation values.

* * * * *